United States Patent Office 3,471,515
Patented Oct. 7, 1969

3,471,515
(2-HYDROXY-3-SUBSTITUTED AMINOPROPOXY)INDOLES
Franz Troxler and Albert Hofmann, Bottmingen, Switzerland, assignors to Sandoz Ltd. (also known as Sandoz AG), Basel, Switzerland
No Drawing. Continuation-in-part of application Ser. No. 521,533, Jan. 19, 1966. This application Dec. 13, 1968, Ser. No. 783,745
Claims priority, application Switzerland, Feb. 1, 1965, 1,338/65; Apr. 14, 1965, 5,264/65; Aug. 25, 1965, 11,954/65; Oct. 14, 1965, 14,206/65; Feb. 9, 1968, 1,987/68
Int. Cl. C07d 27/56; A61k 27/00
U.S. Cl. 260—326.15
14 Claims

ABSTRACT OF THE DISCLOSURE

The compounds of formula

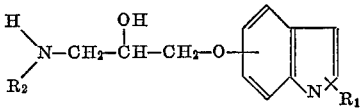

in which $R_1$ signifies a hydrogen atom or a methyl radical and $R_2$ signifies an isopropyl, cyclopropyl, sec.-butyl or tert.-butyl radical, and their acid addition salts. The compounds exhibit valuable pharmacodynamic properties, mainly a pronounced bradycardiac effect and some blood pressure lowering effect which make them particularly valuable in the treatment of coronary illnesses, anginal complaints, cardiac arrhythmia and irregularities of the cardiac rhythm.

---

This application is a continuation-in-part of our copending application Ser. No. 521,533, filed on Jan. 19, 1966.

The present invention provides indole derivatives of Formula I:

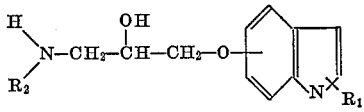

in which $R_1$ signifies a hydrogen atom or a methyl radical, and $R_2$ signifies an isopropyl, cyclopropyl, sec.-butyl or tert.-butyl radical, and their acid addition salts.

It will be appreciated that when $R_1$ signifies a methyl radical, this radical may be in the 1-, 2- or 3-position of the indole structure and the basic side chain may be in the 4-, 5-, 6- or 7-position.

It will be readily apparent to one skilled in the art that there is an optically active center at the 2-carbon atom of the propoxy group; that is, the carbon atom carrying the hydroxy radical. The compounds thus exist as optically active isomers which can be prepared from the respective optically active starting material, such starting material being obtained in known manner.

The present invention further provides a process for the production of the compounds of Formula I and their acid addition salts, characterized in that a hydoxyindole derivative of Formula II:

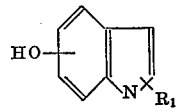

in which $R_1$ has the above significance, in the form of an alkali metal salt, is reacted with epichlorohydrin, the resulting reaction product is heated in the presence of an acid binding agent with an amine of Formula III:

in which $R_2$ has the above significance, and $R_3$ signifies a hydrogen atom or a benzyl radical, any benzyl radical present in the resulting condensation product is split off by hydrogenolysis and, when an acid addition salt is required, the free base is reacted with an inorganic or organic acid.

Examples of suitable starting materials of Formula II are: 4-hydroxyindole, 1-methyl-4-hydroxyindole, 2-methyl-4-hydroxyindole, and 3-methyl-5-hydroxyindole; preferred amines of Formula III are isopropylamine, cyclopropylamine, sec.-butylamine and N-isopropylbenzylamine.

One specific method of effecting the process of the invention is as follows:

The hydroxy-indole derivative of Formula II is used in the form of an alkali metal salt, preferably the sodium salt; for this purpose, it is added to an equimolar amount of aqueous alkali metal hydroxide solution or is reacted in an inert organic solvent, e.g., benzene and toluene, with an equimolar amount of an alkali metal alcoholate, alkali metal amide or alkali metal hydride. One to five equivalents of epichlorohydrin are subsequently added and the mixture is stirred at room temperature for several hours. As the epichlorohydrin molecule has two reactive positions, one usually obtains a mixture of two materials (present in unequal amounts) by this reaction step. As both these materials give rise to only one end product when the next reaction step is effected, it is not necessary to separate the mixture before working up further. Thus the crude mixture resulting by the epichlorohydrin reaction is heated to the boil at reflux for one to several days with an amine of Formula III in the presence of an acid binding agent, e.g., a tertiary organic base (for example, pyridine and triethylamine), an inorganic base (for example, potassium carbonate) or, preferably an excess of the amine of Formula III. The one of the two epichlorohydrin reaction products present in larger quantity usually reacts at a temperature of 50–60° C., whereas the other one only reacts above that temperature range. When a primary amine of Formula III, wherein $R_3$ signifies a hydrogen atom is used, the required end product is obtained directly, but due to the relatively low boiling point of these amines, it is usually necessary to raise the boiling temperature of the mixture to a temperature range which is suitable for the reaction (50–100° C.) by the addition of a diluent having a higher boiling point, e.g., toluene, or to effect the reaction in a pressure vessel. However, when a secondary amine of Formula III wherein $R_3$ signifies a benzyl radical is used, which is more suitable for the reaction due to its higher boiling point, the compound of Formula 1 may readily be obtained from the resulting product by splitting off the benzyl radical hydrogenolytically, e.g., by shaking the palladium and hydrogen in an inert solvent.

The compounds of Formula I may be isolated and purified in the form of the free bases or in the form of their salts by methods known per se. They are colorless, usually crystalline compounds, which are difficulty soluble in water and usually readily soluble in organic solvents. With Keller's reagent (glacial acetic acid containing iron-III-chloride and concentrated sulphuric acid) and Van Urk's reagent (p-dimethylaminobenzaldehyde and dilute sulphuric acid) they usually give characteristic color reactions.

As pointed out above, the present invention also includes the acid addition salts of the compounds of Formula I; examples of acids for acid addition salt formation are: hydrochloric, hydrobromic, sulphuric, fumaric, maleic, tartaric, benzoic, methanesulphonic, ethanesulphonic and p-toluenesulphonic acid.

In tests effected with animals the compounds of Formula I exhibit valuable pharmacodynamic properties, especially a pronounced bradycardiac effect of long duration and some blood pressure lowering effect.

The compounds of Formula I are therefore indicated for use in therapy, especially in the prophylaxis or treatment of coronary illnesses and anginal complaints, in the treatment of cardiac arrhythmia and rhythm irregularities which are accompanied by a tachycardia and in the treatment of hypertonia. The compounds are preferably administered in the form of their water-soluble, physiologically acceptable salts. A suitable daily average dose of the compounds of Formula I is 1–50 mg.

The compounds of Formula I may be used as pharmaceuticals on their own or in the form of appropriate medicinal preparations for administration, e.g., enterally or parenterally. In order to produce suitable medicinal preparations the compounds are worked up with organic or inorganic adjuvants which are inert and physiologically acceptable. Examples of such adjuvants are—

For tablets and dragées: lactose, starch, talc and stearic acid;
For injectable solutions: water, alcohols, glycerin and vegetable oils;
For suppositories: natural or hardened oils and waxes.

The preparations may furthermore contain suitable preserving, stabilizing and wetting agents, solubilizers, sweetening and coloring substances and flavorings.

The present invention also provides pharmaceutical compositions containing in addition to a physiologically acceptable carrier, a compound I and/or a physiologically acceptable acid addition salt thereof.

The hydroxyindoles (II) used as starting materials, in which $R_1$ signifies hydrogen, are known. The derivatives having a methyl radical in the pyrrole ring may, for example, be obtained as follows:

(1) Methyl radical in the 1-position

A benzyloxyindole of Formula IV

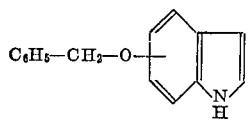

is methylated, e.g., by reacting with methyl iodide in liquid ammonia with the addition of sodium amide, and the benzyl radical is subsequently split off hydrogenolytically, e.g., by shaking with palladium and hydrogen in methanol.

(2) Methyl radical in the 3-position

A benzyloxyindole of Formula IV is converted to the corresponding benzyloxygramine with formaldehyde and dimethylamine in slightly acid solution and the benzyloxygramine is hydrogenated with palladium in methanol whereby the benzyl and dimethylamino radicals are split off simultaneously.

(3) Methyl radical in the 2-position (a) 7 - hydroxy-2-methylindole: 2-nitro-3-benzyloxybenzaldehyde is condensed with nitroethane in the presence of ammonium acetate, the resulting compounds of Formula V

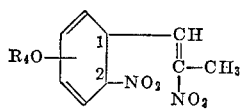

wherein $R_4O$ signifies a benzyloxy radical in the 3-position, is reduced by treating with iron powder and cyclized in alcohol/acetic acid and the resulting 7-benzyloxy-2-methylindole is debenzylated by hydrogenation with palladium in methanol.

(b) 6 - hydroxy - 2 - methylindole: 2-nitro-4-methoxybenzaldehyde is condensed with nitroethane in the presence of ammonium acetate, the resulting compound of Formula V, wherein $R_4O$ signifies a methoxy radical in the 4-position, is cyclized and reduced as indicated at (a) and the methyl ether radical of the resulting product is split by treating with aluminum chloride.

(c) 5-hydroxy-2-methylindole: 3-hydroxybenzaldehyde is converted to the corresponding carbonate with phosgene, this carbonate is nitrated and split with sodium hydroxide solution, the hydroxy radical of the resulting compound is benzylated, condensation is effected with nitroethane in the presence of ammonium acetate, the resulting compound of Formula V, wherein $R_4O$ signifies a benzyloxy radical in the 5-position, is cyclized and reduced as indicated at (a) and the resulting 5-benzyloxy-2-methylindole is debenzylated hydrogenolytically.

(d) 4 - hydroxy-2-methylindole: 4-benzyloxyindole-2-carboxylic acid is converted, via the acid chloride, to the corresponding dimethylamide and the last mentioned compound is reduced with lithium aluminum hydride to the corresponding dimethylamine, which is quaternized with a methyl halide, 2-cyanomethyl-4-benzyloxyindole is obtained from the resulting product by boiling with aqueous sodium cyanide, this indole is hydrolyzed and the resulting acid is decarboxylated and the benzyl radical is split off hydrogenolytically.

In the following nonlimitative examples, all temperatures are indicated in degrees centigrade; the melting and boiling points are uncorrected.

EXAMPLE 1

4-(2-hydroxy-3-isopropylaminopropoxy)indole 7.3 g. of 4-hydroxyindole and subsequently 4.5 ml. of epicholorohydrin are added whilst stirring in an atmosphere of nitrogen to a solution of 2.25 g. of sodium hydroxide in 50 ml. of water. Stirring is effected at room temperature for a further 24 hours, the reaction mixture is extracted four times with methylene chloride and the combined organic layers which have been dried over magnesium sulphate are evaporated at reduced pressure. The oily residue is taken up in 50 ml. of toluene and 50 ml. of isopropylamine and heated at reflux at a bath temperature of 70° for 2½ days. Evaporation to dryness is effected at reduced pressure, the residue is shaken thrice between ethyl acetate and a N tartaric acid solution and a 5 N sodium hydroxide solution is then added to the combined tartaric acid phases until an alkaline reaction is obtained. The resulting precipitate is filtered, washed with water and recrystallized from ethanol. Melting point 171–173° (needles).

Keller's color reaction (0.2 mg.): olive green;
Van Urk's color reaction (1 mg.): before exposure to light lilac, afterwards dark lilac-violet.

EXAMPLE 2

5-(2-hydroxy-3-isopropylaminopropoxy)indole

This compound is obtained from 3.05 g. of sodium hydroxide in 60 ml. of water, 10.0 g. of 5-hydroxyindole and 6.1 ml. of epicholorohydrin in a manner analogous to that described in Example 1. Melting point 182–185° (needles from ethanol).

Keller's color reaction (0.2 mg.): light brown;
Van Urk's color reaction (1 mg.): before exposure to light grenadine, afterwards red.

EXAMPLE 3

6-(2-hydroxy-3-isopropylaminopropoxy)indole

This compound is obtained from 2.25 g. of sodium hydroxide in 45 ml. of water, 7.35 g. of 6-hydroxyindole and 4.5 ml. of epicholorohydrin, in a manner analogous to that described in Example 1. Melting point 146–148° (druses from ethanol).

Keller's color reaction (0.2 mg.): dark greyish brown;
Van Urk's color reaction (1 mg.): dingy dark green.

EXAMPLE 4

1-methyl-5-(2-hydroxy-3-isopropylaminopropoxy)indole 10.6 g. of 1-methyl-5-hydroxyindole and subsequently 7.4 ml. of epichlorohydrin are added whilst stirring in an atmosphere of nitrogen to a solution of 2.78 g. of sodium hydroxide in 65 ml. of water. Stirring is effected at room temperature for a further 15 hours, the reaction mixture is extracted four times with 50 ml. of methylene chloride and the combined organic layers which have been dried over magnesium sulphate are evaporated at reduced pressure. An oil which crystallizes is obtained as residue, is dissolved in 50 ml. of toluene and 50 ml. of isopropylamine and heated to the boil for 45 hours. Evaporation to dryness is effected in a vacuum, the residue is shaken out thrice between ethyl acetate and a N tartaric acid solution and a 5 N sodium hydroxide solution is then added to the combined tartaric acid phases until an alkaline reaction is obtained. The alkaline solution is shaken out thrice with 50 ml. of methylene chloride, the extracts are dried over magnesium sulphate and the solvent evaporated in a vacuum. The oily, viscous residue may be crystallized from ethyl acetate/ether in the form of druses, having a melting point of 76–77°.

Keller's color reaction (0.2 mg.): raspberry-red;
Van Urk's color reaction (1 mg.): dark red.

1-methyl-5-hydroxyindole (melting point 129–130°, needles from benzene) is obtained by debenzylating 1-methyl-5-benzyloxyindole (melting point 125–127°, leaflets from chloroform) with hydrogen in the presence of a 5% palladium catalyst on aluminum oxide.

1-methyl-5-benzyloxyindole is obtained by methylation of 5-benzyloxyindole with methyl iodide in liquid ammonia with the addition of sodium amide.

EXAMPLE 5

1-methyl-4-(2-hydroxy-3-isopropylaminopropoxy)indole

This compound is obtained from 2.73 g. of sodium hydroxide in 65 ml. of water, 10.0 g. of 1-methyl-4-hydroxyindole and 7.4 ml. of epichlorohydrin, in a manner analogous to that described in Example 4. Melting point 79–81° (from ethyl acetate/ether).

Keller's color reaction (0.2 mg.): dark blue;
Van Urk's color reaction (1 mg.): red-violet.

1-methyl-4-hydroxyindole (melting point 89–91°, druses from benzene/ligroin) is obtained by debenzylation of 1-methyl-4-benzyloxyindole (melting point 71–73°, prisms from ether) with hydrogen in the presence of a 5% palladium catalyst on aluminum oxide.

1-methyl-4-benzyloxyindole is obtained by methylation of 4-benzyloxyindole with methyl iodide in liquid ammonia with the addition of sodium amide.

EXAMPLE 6

3-methyl-4-(2-hydroxy-3-isopropylaminopropoxy)indole 21.2 g. of 3-methyl-4-hydroxyindole and subsequently 17 ml. of epichlorhydrin are added whilst stirring in an atmosphere of nitrogen to a solution of 5.8 g. of sodium hydroxide in 140 ml. of water. Stirring is effected at room temperature for a further 15 hours, the reaction mixture is extracted four times with 100 ml. of chloroform and the combined organic layers which have been dried over magnesium sulphate are evaporated at reduced pressure. An oil is obtained as residue, which is heated to the boil for 3 days in 90 ml. of toluene and 90 ml. of isopropylamine. Evaporation to dryness is effected in a vacuum, the residue is shaken out thrice between ethyl acetate and a N tartaric acid solution and a 5 N sodium hydroxide solution is then added to the combined tartaric acid phases until an alkaline reaction is obtained. The alkaline solution is shaken out four times with 100 ml. of chloroform, the extracts are dried over magnesium sulphate and the solvent evaporated in a vacuum. The oily, viscous residue may be crystallized from benzene with a small amount of ligroin. Melting point 95–97° C.

Keller's color reaction (0.2 mg.): olive;
Van Urk's color reaction (1 mg.): blue violet.

The 3-methyl-4-hydroxyindole used as starting material is obtained by hydrogenolysis of 4-benzyloxygramine (melting point 194–198°, leaflets from chloroform) in the presence of a 5% palladium catalyst on aluminium oxide, whereby the dimethylamino and benzyl radicals are simultaneously split off. Melting point 122–124°, from benzene.

EXAMPLE 7

3-methyl-5-(2-hydroxy-3-isopropylaminopropoxy)indole

This compound is obtained from 2.75 g. of sodium hydroxide in 65 ml. of water, 10.5 g. of 3-methyl-5-hydroxyindole and 7.5 ml. of epichlorohydrin in a manner analogous to that described in Example 6. Melting point 178–180°, needles from ethanol).

Keller's color reaction (0.2 mg.): red with a tinge of brown;
Van Urk's color reaction (1 mg.): green blue.

3-methyl-5-hydroxyindole is obtained by hydrogenolysis of 5-benzyloxygramine (melting point 138°, from chloroform) in the presence of a 5% palladium catalyst on aluminium oxide, whereby the dimethylamino and the benzyl radicals are simultaneously split off. Boiling point 145–150°/0.05 mm. of Hg; melting point 110–112°.

EXAMPLE 8

4-(2-hydroxy-3-cyclopropylaminopropoxy)indole 7.0 g. of 4-hydroxyindole and subsequently 6.3 ml. of epichlorohydrin are added whilst stirring in an atmosphere of nitrogen to a solution of 2.15 g. of sodium hydroxide in 40 ml. of water. Stirring is then effected at room temperature for a further 20 hours, the reaction mixture is extracted four times with methylene chloride and the combined organic layers which have been dried over magnesium sulphate are evaporated at reduced pressure. The semicrystalline residue is taken up in 50 ml. of toluene and 50 ml. of cyclopropylamine and heated at reflux at a bath temperature of 70° for 2½ days. Evaporation to dryness is effected at reduced pressure, the residue is shaken out four times between ethyl acetate and a N tartaric acid solution and a 5 N sodium hydroxide solution is added to the combined tartaric acid phases until an alkaline reaction is obtained. Extraction is then effected four times with methylene chloride and the combined organic layers which have been dried over magnesium sulphate are evaporated at reduced pressure. The remaining crude 4-(2-hydroxy-3-cyclopropylaminopropoxy)indole crystallizes from ethyl acetate in the form of needle druses having a melting point of 118–120°.

Keller's color reaction (0.2 mg.): olive green;
Van Urk's color reaction (1 mg.): light violet.

EXAMPLE 9

4-(2-hydroxy-3-sec.-butylaminopropoxy)indole

This compound is obtained from 2.15 g. of sodium hydroxide in 40 ml. of water, 7.0 g. of 4-hydroxyindole and 6.3 ml. of epichlorohydrin in a manner analogous to that described in Example 8, whereby sec.-butylamine is used in place of cyclopropylamine. The compound mentioned in the heading forms prims having a melting point of 154–156° from methanol/ethyl acetate.

Keller's color reaction (0.2 mg.): olive green;
Van Urk's color reaction (1 mg.): lilac.

EXAMPLE 10

4-(2-hydroxy-3-isopropylaminopropoxy)-2-methylindole 11.6 g. of 4-hydroxy-2-methylindole and subsequently 12.4 g. of epichlorhydrin are added while stirring in an atmosphere of nitrogen to a solution of 3.1 g. of sodium hydroxide in 150 cc. of water. Stirring is then effected at room temperature for a further 24 hours, the reaction mixture is extracted 4 times with methylene chloride and the combined organic layers which have been dried over magnesium sulphate are evaporated at reduced pressure. The residue is taken up in 150 cc. of dioxane and 50 cc. of isopropylamine and heated to the boil for 6 hours. Evaporation to dryness is effected at reduced pressure, the residue is shaken out 4 times between ethyl acetate and a N aqueous tartaric acid solution and a 5 N sodium hydroxide solution is added to the combined tartaric acid phases until an alkaline reaction is obtained. Extraction is then effected 6 times with methylene chloride, the combined extracts are dried over magnesium sulphate and the solvent is evaporated in a vacuum. The oily, viscous residue crystallizes from ethyl acetate; M.P. of the title compound 95–97°.

Keller's color reaction (0.2 mg.): grey violet;
Van Urk's color reaction (1 mg.): red brown.

The 4-hydroxy-2-methylindole used as starting material (M.P. 112–115°, from benzene/ethyl acetate) is obtained by hydrogenation of 4-benzyloxy-2-dimethylaminomethylindole (M.P. 117–120°, druses from benzene) in the presence of a 5% palladium catalyst on aluminum oxide.

EXAMPLE 11

4-(2-hydroxy-3-tert.-butylaminopropoxy)-2-methylidindole 11.6 g. of 4-hydroxy-2-methylindole and subsequently 12.4 cc. of epichlorhydrin are added while stirring in an atmosphere of nitrogen to a solution of 3.1 g. of sodium hydroxide in 150 cc. of water. Stirring is effected at room temperature for a further 24 hours, the reaction mixture is extracted 4 times with methylene chloride and the combined organic layers which have been dried over magnesium sulphate are evaporated at reduced pressure. 14.6 g. of the semicrystalline residue are taken up in 100 cc. of dioxane and 21 g. of tert.-butylamine and heated to the boil for 16 hours. Evaporation of dryness is effected at reduced pressure, the residue is shaken out 4 times between ethyl acetate and a N tartaric acid solution and a 5 N sodium hydroxide solution is added to the combined tartaric acid phases until an alkaline reaction is obtained. Extraction is then effected 4 times with methylene chloride, the extracts are dried over magnesium sulphate and the solvent is evaporated in a vacuum. The oily crude product is filtered with benzene+1% of methanol through 150 g. of aluminum oxide, the filtrate is evaporated and the remaining 4-(2-hydroxy-3-tert.-butylaminopropoxy)-2-methylindole is crystallized from ethyl acetate, M.P. 131–133°.

Keller's color reaction (0.2 mg.):violet;
Van Urk's color reaction (1 mg.):red.

EXAMPLE 12

(−)-4-(2-hydroxy-3-isopropylaminopropoxy)indole 21.6 g. of 4-hydroxyindole and subsequently 15.0 g. of (−)-epichlorhydrin are added while stirring in an atmosphere of nitrogen to a solution of 6.5 g. of sodium hydroxide in 150 cc. of water. Stirring is then effected at room temperature for a further 14 hours, the reaction mixture is extracted 4 times with methylene chloride and the combined organic layers which have been dried over magnesium sulphate are evaporated at reduced pressure. The oily residue is taken up in 120 cc. of dioxane and 60 cc. of isopropylamine and refluxed for 20 hours. Evaporation to dryness is effected at reduced pressure, the residue is shaken out 3 times between ethyl acetate and a N aqueous tartaric acid solution and 5 N sodium hydroxide solution is added to the combined tartaric acid phases until alkaline. Extraction is then effected 3 times with methylene chloride, the combined organic phases are dried over magnesium sulphate and then evaporated under reduced pressure. The (−)-4-(2-hydroxy-3-isopropylaminopropoxy)indole obtained is crystallized three times from benzol, and melts at 89–91°; $[\alpha]_D^{20} = -4.2°$ (c.=5.3 in methanol).

EXAMPLE 13

Example of a medicinal preparation (tablets):

For every tablet, g.

| | |
|---|---|
| 4-(2-hydroxy-3-isopropylaminopropoxy)indole (compound of Example 1) | 0.010 |
| Magnesium stearate | 0.001 |
| Polyvinylpyrrolidone | 0.004 |
| Talcum | 0.005 |
| Maize starch | 0.010 |
| Lactose | 0.128 |
| Dimethyl-silicone oil | 0.0005 |
| Polyethylene glycol 6000 | 0.0015 |
| | 0.160 |

The active compound is mixed in dry state with the magnesium stearate, polyvinylpyrrolidone, talcum, maize starch and lactose. The resulting mixture is moistened with an aqueous suspension of dimethyl-silicone oil and polyethylene glycol, the mass is kneaded, granulated and the dried and crushed granulate is pressed into tablets. 100 g. of the tabletting mass theoretically yield 625 tablets each weighing 0.160 g. and containing 10 mg. of active compound.

What is claimed is:

1. A compound of the formula:

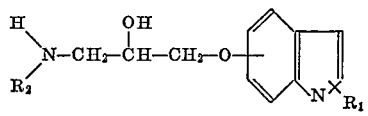

in which

R₁ is hydrogen or methyl, and
R₂ is isopropyl, cyclopropyl, secondary butyl or tertiary butyl, or a pharmaceutically acceptable acid addition salt thereof.

2. A compound of the formula:

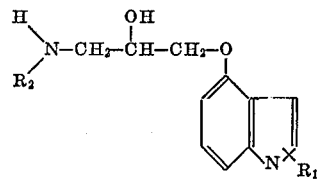

in which

R₁ is hydrogen or methyl, and
R₂ is isopropyl, cyclopropyl, secondary butyl or tertiary butyl, or a pharmaceutically acceptable acid addition salt thereof.

3. A compound of claim 1 which is 4-(2-hydroxy-3-isopropylaminopropoxy)indole.

4. A compound of claim 1 which is 5-(2-hydroxy-3-isopropylaminopropoxy)indole.

5. A compound of claim 1 which is 6-(2-hydroxy-3-isopropylaminopropoxy)indole.

6. A compound of claim 1 which is 1-methyl-5-(2-hydroxy-3-isopropylaminopropoxy)indole.

7. A compound of claim 1 which is 1-methyl-4-(2-hydroxy-3-isopropylaminopropoxy)indole.

8. A compound of claim 1 which is 3-methyl-4-(2-hydroxy-3-isopropylaminopropoxy)indole.

9. A compound of claim 1 which is 3-methyl-5-(2-hydroxy-3-isopropylaminopropoxy)indole.

10. A compound of claim 1 which is 4-(2-hydroxy-3-cyclopropylaminopropoxy)indole.

11. A compound of claim 1 which is 4-(2-hydroxy-3-sec.-butylaminopropoxy)indole.

12. A compound of claim 1 which is 4-(2-hydroxy-3-isopropylaminopropoxy)-2-methylindole.

13. A compound of claim 1 which is 4-(2-hydroxy-3-tert.-butylaminopropoxy)-2-methylindole.

14. A compound of claim 1 which is (−)-4-(2-hydroxy-3-isopropylaminopropoxy)indole.

References Cited
UNITED STATES PATENTS 3,328,417   6/1967   McLoughlin et al. ___ 260—307

ALEX MAZEL, Primary Examiner

J. A. NARCAVAGE, Assistant Examine

U.S. Cl. X.R.

260—236.16; 424—274